United States Patent [19]
Possati et al.

[11] Patent Number: 6,014,905
[45] Date of Patent: Jan. 18, 2000

[54] MEASURING APPARATUS WITH AN ANALOG-DIGITAL DISPLAY UNIT

[75] Inventors: Stefano Possati, Bologna; Luciano Ventura, Zola Predosa; Giovanni Gurrieri, Castenaso, all of Italy

[73] Assignee: Marposs Societa' Per Azioni, Bentivoglio, Italy

[21] Appl. No.: 08/945,456

[22] PCT Filed: May 6, 1996

[86] PCT No.: PCT/EP96/01873

§ 371 Date: Oct. 27, 1997

§ 102(e) Date: Oct. 27, 1997

[87] PCT Pub. No.: WO96/35925

PCT Pub. Date: Nov. 14, 1996

[30] Foreign Application Priority Data

May 10, 1995 [IT] Italy ................................ BO95A0214

[51] Int. Cl.[7] ............................. G01D 11/24; G01D 7/00; G01D 18/00
[52] U.S. Cl. ............................ 73/866.3; 73/431; 73/1.88; 33/502
[58] Field of Search ................................. 73/866.3, 431, 73/866.1, 1.81, 1.88; 33/502

[56] References Cited

U.S. PATENT DOCUMENTS

| | | | |
|---|---|---|---|
| 4,289,382 | 9/1981 | Clark | 345/50 |
| 4,876,647 | 10/1989 | Gardner et al. | 364/528.19 |
| 5,153,585 | 10/1992 | Negishi et al. | 340/870.28 |
| 5,311,777 | 5/1994 | Cunningham et al. | 73/866.3 X |
| 5,351,929 | 10/1994 | Vallance | 248/544 |
| 5,471,885 | 12/1995 | Wagner | 73/431 X |

FOREIGN PATENT DOCUMENTS

| | | |
|---|---|---|
| 0 097 520 | 1/1984 | European Pat. Off. |
| 40 30 368 | 11/1991 | Germany. |
| 57221 | 4/1982 | Japan. |
| 81444 | 12/1982 | Japan. |
| 2 037 022 | 7/1980 | United Kingdom. |
| 2 134 655 | 8/1984 | United Kingdom. |
| WO 93/20346 | 10/1993 | WIPO. |

*Primary Examiner*—Thomas P. Noland
*Attorney, Agent, or Firm*—Dickstein Shapiro Morin & Oshinsky LLP

[57] ABSTRACT

A display unit, connected to a measuring head, has a substantially right parallelepipedon shaped casing, considerably smaller in width with respect to length and depth, with a front face having dimensions corresponding to length and width, on which there are two display devices, substantially one analog and the other digital, placed adjacent to and arranged along the length of the front face. A programming and control keyboard is arranged at a base of the casing, and a device is associated with the casing for coupling the display unit, particularly small in overall dimensions in relation with functionality, to an external support.

24 Claims, 3 Drawing Sheets

6,014,905

MEASURING APPARATUS WITH AN ANALOG-DIGITAL DISPLAY UNIT

TECHNICAL FIELD

The invention relates to a measuring apparatus comprising a display unit with a substantially right parallelepipedon shaped casing, considerably smaller in width with respect to length and depth, two display devices, substantially one of the analog and the other of the digital type, located at a front face of the casing having dimensions corresponding to said length and width, placed adjacent to each other and arranged along the length of the front face, a keyboard for programming and control purposes, and a measuring head.

BACKGROUND ART

Among the electronic measuring apparatuses, for example those for measuring linear dimensions of mechanical workpieces, there can be distinguished two types of relatively simple apparatuses—insofar as the type of measurements and processings are concerned—, i.e. "column" or "dial" type apparatuses, or comparators.

The column apparatus comprises a display unit (normally also acting as a power supply, detector and processor) with a substantially right parallelepipedon shaped casing, considerably smaller in width with respect to length and depth. At least two display devices—one of the analog and the other of the digital type—and a programming and control keyboard are arranged at a front face of the casing having dimensions corresponding to the aforementioned length and width. Electric connectors are arranged at a rear face of the casing, and provide connection, by means of cables, with the electric power supply network, input devices, more specifically one or more measuring heads, and output devices, like relays, additional measurement signal processors, etc. The analog display device, for example of the light emitting diode (LED) type or with segments consisting of small gas discharge tubes, is generally arranged along the length of the front face, substantially as a vertical scale, while the digital device, usually of the light segments type, is arranged along the direction of the width of the front face. In fact, typically the socalled "electronic columns" are vertically arranged and rest on a table or on a support plane by means of legs clamped to a lower base of the casing.

There are also known apparatuses, deriving from the column-type ones, arranged horizontally and resting on a table or a support plane, in which both the display devices are arranged in a horizontal direction.

These electronic columns are rather bulky and, in the event a plurality of vertical columns are arranged side by side (or horizontally arranged apparatuses are superimposed one upon another) for the display of a plurality of measurements relating to the same workpiece, the overall dimensions may give rise to inconveniences, such as the need to arrange the columns at a considerable distance from the associated measuring heads and the difficulty in readily and accurately viewing the various measurements on display.

The so-called "dial-type" electronic comparators, or similar ones, like the comparator disclosed in U.S. Pat. No. 4,289,382 and the one disclosed in European patent EP-B-0097520 are considerably more compact. These comparators comprise a display unit with a substantially cylindric casing, of small thickness, or a substantially prismatic casing. At a front face of the casing there are arranged two display devices, one of the analog and the other of the digital type. Some keys, or a keyboard, are located at the same front face of the casing, or at its lateral surface (annular surface, or rectangular faces). A measuring head, more specifically a measuring head of the so-called "cartridge type", can be directly coupled, by means of a mechanical coupling, to the casing of the display unit, or it can be remotely located and thus connected via cable to the display unit.

The dial comparator is typically coupled to an external support by means of a locking device that, in the case of a comparator with an integrated measuring head, is coupled to the head casing.

In relatively simple measuring benches it could be desirable to use measuring heads with integrated display units. For example, in a measuring bench for checking a plurality of diameters of shaft-like workpieces, manually positioned in the measuring position, it could be desirable to arrange the apparatuses (with integrated measuring heads) side by-side according to the shaft axis direction. The known dial type comparators are not always fit for performing this; for example, when it is required to check diameters at several closely spaced apart cross-sections of the shaft. Under such a circumstance the overall dimensions of the front faces of the display units can render impossible this arrangement and apparatuses with remote measuring heads must be used, as disclosed in European patent EP-B-0097520. However, also for this arrangement, the overall dimensions of the front faces of the display units do not enable to achieve a compact and easily readable display group.

DISCLOSURE OF THE INVENTION

Object of the present invention is to provide an extremely compact apparatus, particularly small in overall dimensions, specifically with regard to the arrangement of the display devices.

This is achieved by a measuring apparatus comprising a display unit with a substantially right parallelepipedon shaped casing, considerably smaller in width with respect to length and depth, two display devices, substantially one of the analog and the other of the digital type, located at a front face of the casing having dimensions corresponding to said length and width, placed adjacent to each other and arranged along the length of the front face, a keyboard for programming and control purposes, and a measuring head, wherein the keyboard is arranged at a base of the casing and a locking device, for coupling the display unit to an external support, is associated with the casing.

Other aspects of the invention regard particularly simple electric detecting circuits, including a measuring circuit oscillating at a relatively low frequency and a detector circuit based on period measurement, and a support device—for supporting a plurality of display units connected to remote measuring heads—that enables the display units to be arranged in a compact way.

The mechanical and the electrical characteristics of the apparatus according to the invention enable to combine remarkable-functionality with limited costs.

The invention provides the possibility of arranging side by side, or superimposing, a plurality of display units, so occupying minimum overall dimensions in the direction abreast, and ensuring, among other things, quick and easy reading of the data on display. These and other advantages are attained both when the apparatuses have measuring heads integrated with the display units and when the apparatuses have remote measuring heads.

BRIEF DESCRIPTION OF THE DRAWINGS

The invention is now described in detail—for illustrative and non limiting purposes—with reference to the enclosed sheets of drawings, wherein.

BEST MODE FOR CARRYING OUT THE INVENTION

Figure 2:
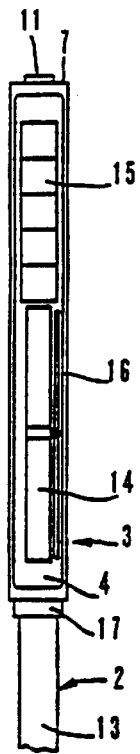
FIG. 2 is a front view of part of the apparatus shown in FIG. 1.

The apparatus shown in FIGS. 1–4 comprises a display unit 1 and a measuring head 2 rigidly coupled, but in an adjustable way, to display unit 1.

The display unit 1 comprises a substantially right parallelepipedon shaped casing 3, considerably smaller in width with respect to length (i.e. height, according to the arrangement shown in FIG. 1) and depth.

The dimensions of the front face 4 correspond to the length and the width of casing 3. At the rear, on face 5 there is a chamfer 6, also extending to upper base 7, where there is a keyboard for programming and control purposes including four keys 8,9,10 and 11.

A measuring head 2, in this specific case a "cartridge" gauging head for checking linear dimensions, is coupled to the lower base 12 of casing 3. The apparatus is rigidly coupled to an external support, for example a support structure of a bench with manual workpiece loading for the inspection of linear dimensions of a mechanical workpiece, by means of a coupling device, not shown, that cooperates with the cylindrical sleeve 13 of gauging head 2.

At the front face 4 of casing 3 there are located two display devices 14, 15, adjacent to each other and arranged along the length of front face 4.

The display device 14 is of the quasi-analog type and comprises a linear array of light emitting diodes (LED), of the bar graph type. At a side of the array there is a graduated scale 16 for associating a numerical measurement value with the indication provided by the diodes. The array of diodes comprises twenty-one diodes, a central diode and ten diodes at the two sides of the central diode. Each diode is able to selectively provide a green, a red, or a combination (yellow) light.

The display device 15 is of the digital type, comprises a string of five elements with seven segments and can selectively provide numerical information or simple messages in alphabetical letters.

The measuring head 2 is coupled to display unit 1 by means of a locking and adjusting device comprising an annular disk 17, rigidly coupled to the upper part of head 2, a seat 18, having the shape of a cylindrical surface, coupled to casing 3, and a small friction plate 19 with a substantially C-shaped cross-section and 90° edges. Plate 19 has a lower central slot for the passage of the lower portion of disk 17 and two semicircular notches 20, only one of which is visible in FIG. 1. Plate 19 is clamped to base 12 by means of screws, not shown, inserted in threaded holes formed at base 12, and in this way, by virtue of a slight deformation next to notches 20, urges disk 17 to contact seat 18. Furthermore, the thickness of disk 17 is slightly greater than the width (under rest conditions) of plate 19, so that when disk 17 is positioned in plate 19 the latter bends and applies an appropriate amount of pressure to the faces of disk 17. Thus, it is possible to vary the reciprocal arrangement of display unit 1 and measuring head 2, for example, as shown for the positions of the measuring head indicated with dashed lines and identified by reference numbers 2' and 2".

In practice, owing to the fact that the measuring head 2 is clamped to an external support, it is possible to vary the angular arrangement of the display unit 1 with respect to the aforementioned external support. The arrangement can be varied by means of angular adjustments about two axes, corresponding to the geometric axis of disk 17 (this axis is parallel to the direction of the width of casing 3) and to the axis of cylindrical sleeve 13.

At the rear face 5 of casing 3, more exactly at chamfer 6, there are coupled electric connectors 21, for the power supply of display unit 1 and measuring head 2 and for the accomplishing of various input-output functions.

The previously described structure of display unit 1, and the type of associated electric circuits, hereinafter described with reference to FIG. 7, enable to achieve display units with very small dimensions, but concurrently extremely functional. Prototypes have been manufactured according to the following dimensions: length 11 cm, width 1.2 cm and depth 6.9 cm. Obviously, these dimensions can vary, but preferably length should not exceed 13 cm, width 1.5 cm and depth 8 cm.

Figure 5:
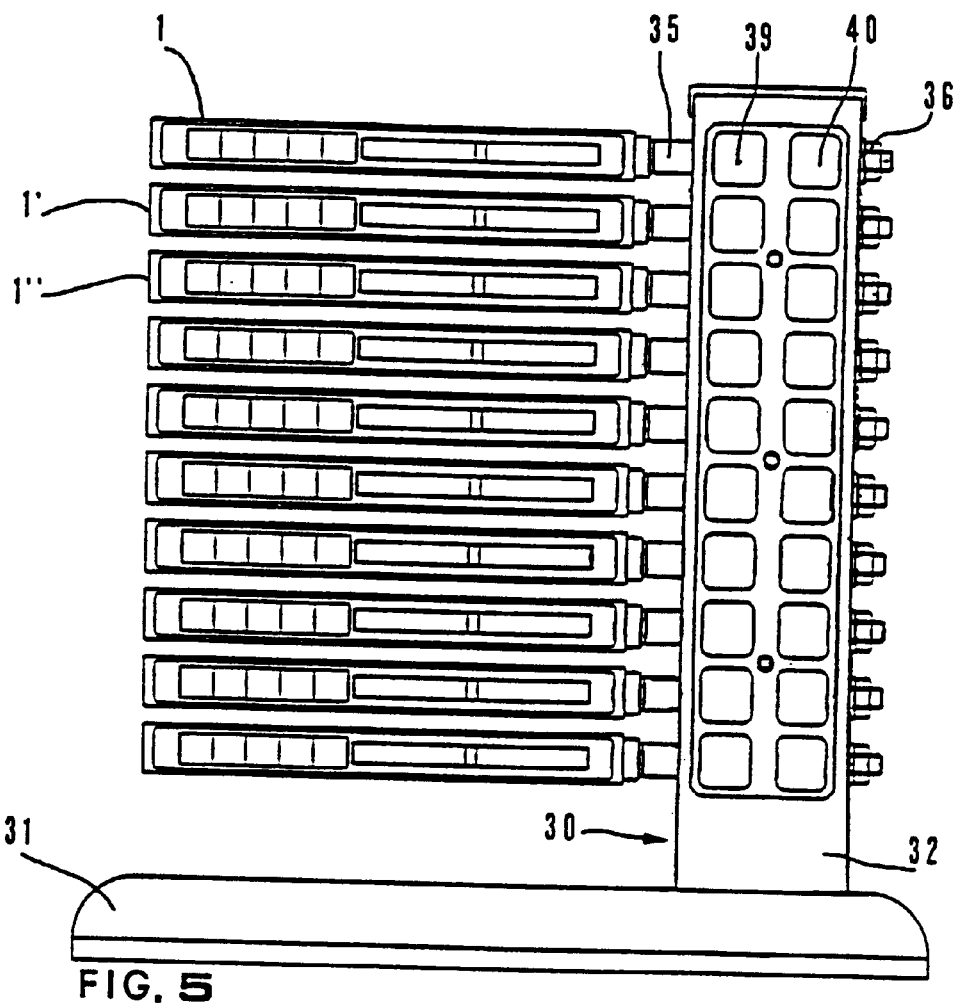
FIG. 5 is a side view of a support device adapted for supporting, in a horizontal position, a plurality of display units like the one shown in FIGS. 1–4, but intended for the connection, by means of cables, with remote measuring heads.
Figure 6:
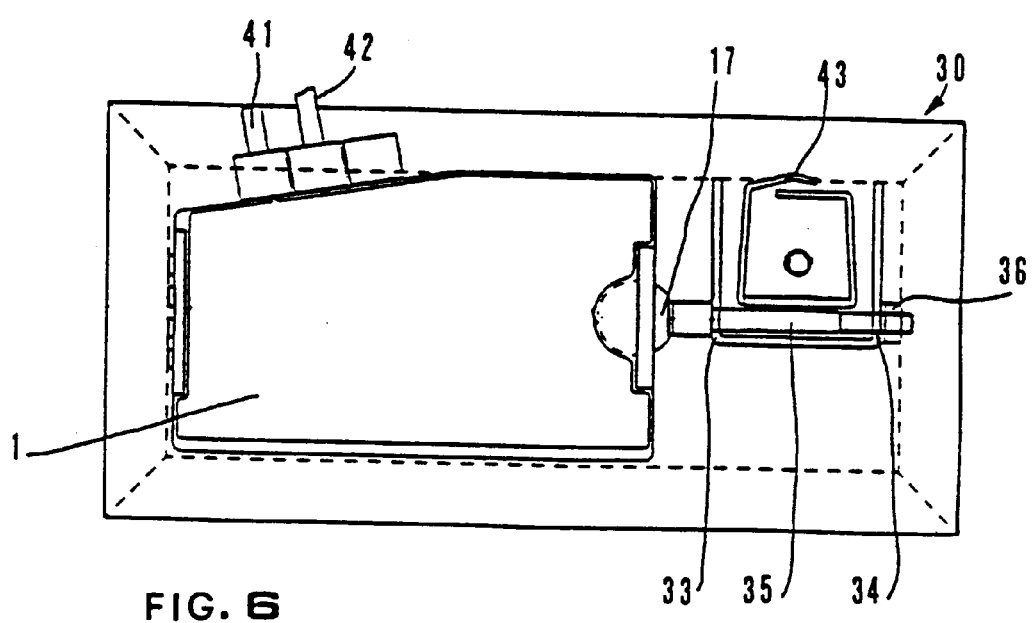
FIG. 6 is a plan view of the support device shown in FIG. 5.

In the event a plurality of display units 1,1',1", etc. are utilized in applications with remote measuring heads, not shown in the drawings, support device 30, shown in FIGS. 5 and 6, enables to arrange the display units 1,1',1", . . . in a very compact way, so as to ensure an easy and quick measurement reading.

The support device 30 comprises a substantially rectangular base plate 31 and a stanchion 32 coupled at a side of plate 31.

Stanchion 32 is made of metal, has a C-shaped cross-section and provides, at the limbs of the C, seats defined by pairs of oppositely arranged holes 33, 34 for enabling the display units 1,1',1", . . . to be fixed to stanchion 32. For this purpose, the disk 17 of each display unit 1,1',1", . . . is rigidly coupled to an end of an associated pin 35 provided with an abutment flange next to disk 17 and a threaded end portion for the clamping of a nut 36. As shown in FIGS. 5 and 6, the flange of pin 35 and nut 36 abut against the limbs of stanchion 32.

The support device 30 shown in FIG. 5 can support up to ten display units 1,1',1", . . . , arranged in a horizontal way, superimposed in a vertical direction, at a small distance from one another.

Furthermore, at the central side of stanchion 32 there are ten pairs of seats, arranged in two adjacent rows, each arranged at the same height as an associated display unit 1,1',1", . . . , or an associated pair of holes 33,34. In the seats there can be applied magnetic plates 39,40. The plates arranged at the left, 39, can present symbols or other indications as to the type of measurement displayed by the associated display unit 1,1',1", . . . and those arranged at the right, 40, can present a number for identifying the measurement.

The cables 41,42, etc. connected to the display units 1,1',1", . . . can be gathered together and stay arranged in this way for a certain section, inside a channel 43 coupled to plate 31 at the interior of stanchion 32.

As hereinbefore set forth, the extremely compact but very functional structure of display unit 1 is feasible also by virtue of the type of the associated electric circuits, that are now described with reference to FIG. 7.

Figure 1:
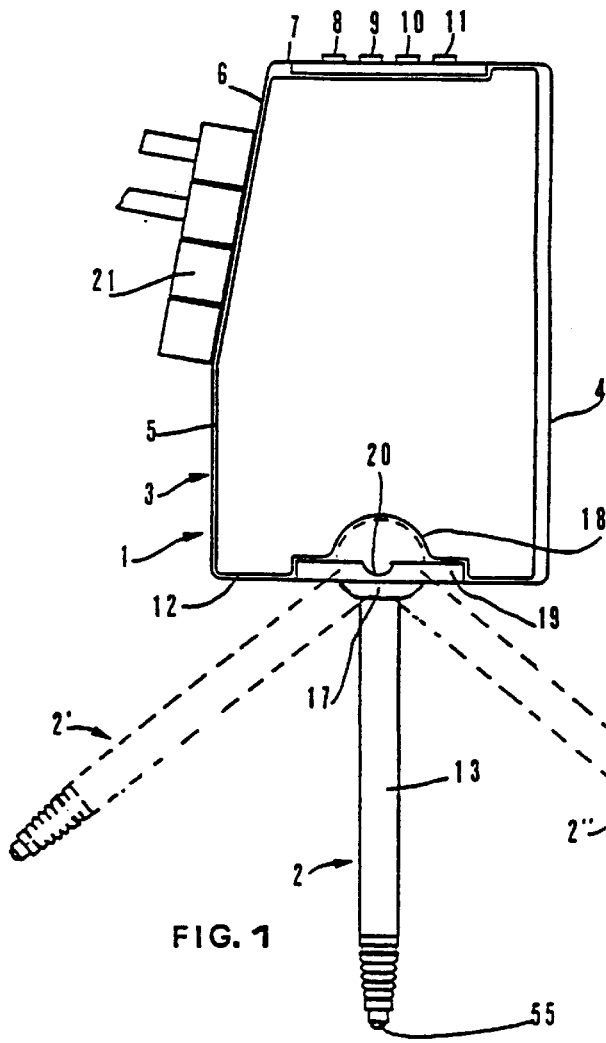
FIG. 1 is a side view of a measuring apparatus comprising a display unit and a measuring head coupled, in an adjustable way, to the display unit.
Figure 3:
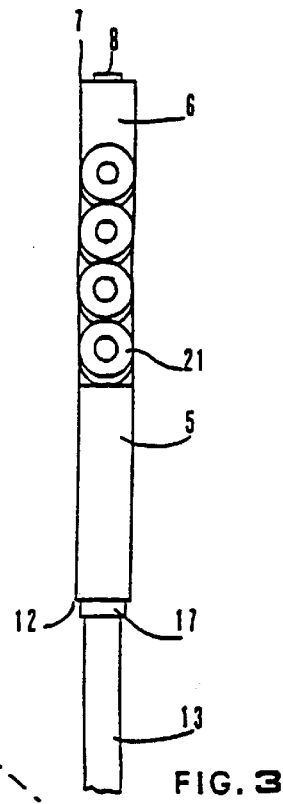
FIG. 3 is a rear view of part of the apparatus shown in FIGS. 1 and 2.
Figure 7:
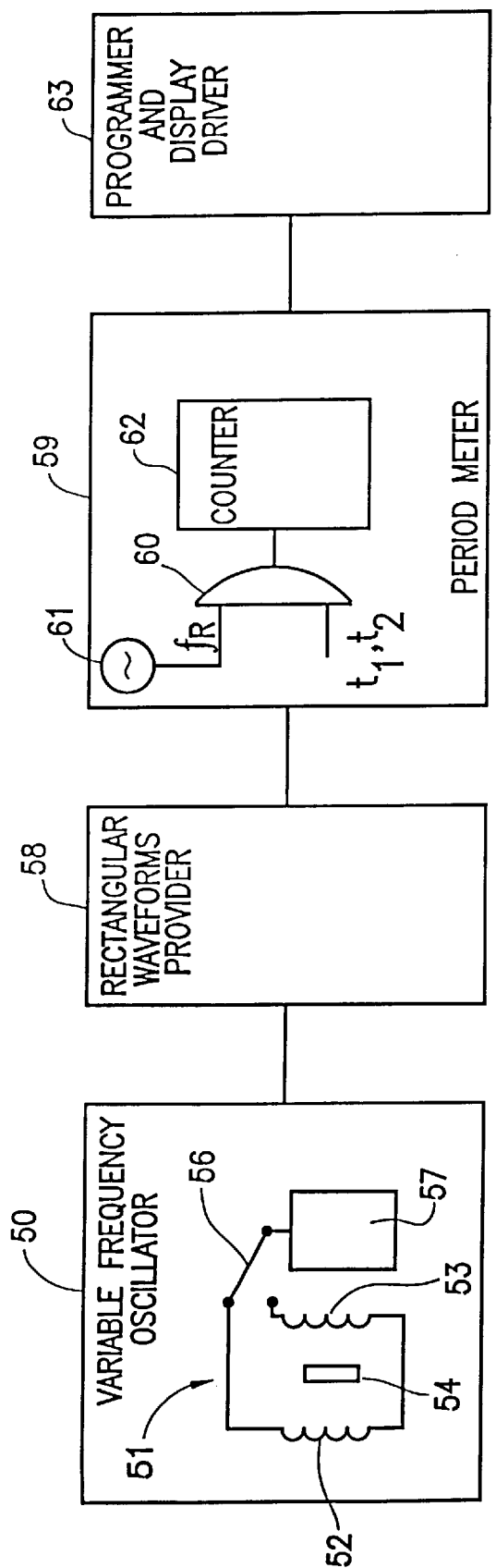
FIG. 7 is, substantially, a block diagram showing the circuits of the apparatus illustrated in FIGS. 1 to 4.

More particularly, the simplified block diagram in FIG. 7 shows a variable frequency oscillator circuit 50 that comprises the transducer 51 of measuring head 2, with two inductances 52, 53, the value of which varies depending on the position of a magnetic core 54, movable along with feeler 55 (FIG. 1). When core 54 is in a central position, the frequency of the oscillator circuit so has a prefixed value $f_o$, for example 30 kHz. Both inductances 52, 53 are periodically switched, some ten times per second, by means of an electronic relay, schematically shown as an electromechanical relay 56, over other components 57 of the oscillator circuit 50. Hence, it is possible to provide, at prefixed displacement of core 54 from the central position, two signals with frequencies $f_1$ and $f_2$ that differ by a quantity $f_1-f_2$. The difference $f_1-f_2$, and similarly the difference in the associated periods $t_1-t_2$, depend in a determined way on the deviation value of core 54 from the central position, in other terms on the deviation of the dimension of the workpiece that has to be checked from the associated nominal value. Circuit 58, coupled to circuit 50, provides two signals with rectangular waveforms having periods $t_1$ and $t_2$, respectively, that reach a circuit 59 comprising a gate 60, for receiving at its input a signal at a constant frequency $f_R$, for example 1 MHz, provided by a quartz oscillator 61. The opening of gate 60 is controlled, for some periods, for example ten, alternatively by the signal of period $t_1$ and by that of period $t_2$. Circuit 62, that comprises a counter, receives the constant frequency signal during the time of opening of gate 60 and provides a signal with a value corresponding to $t_1-t_2$, and thus to the deviation of the workpiece dimension from the associated nominal value. By means of this signal, a programming and drive circuit 63 drives the display devices 14 and 15.

The circuits shown in FIG. 7 have some similarities with those described in European patent EP-B-0097520, with some important differences. Firstly, the resonance frequency of the oscillator circuit 50 comprising the transducer of measuring head 2 is much lower (30 kHz instead of 500 kHz). This increases the response time in the measurement detecting, that in any case is by all means appropriate to the type of manually operated apparatus. A fundamental advantage deriving from the use of a lower oscillation frequency is the considerable reduction of the sensitivity of the circuits with respect to noises, more specifically with respect to the noises caused by changes in the capacity of the cable connecting the display apparatus 1 to a remote measuring head. In the apparatus disclosed in EP-B-0097520 it is necessary to attenuate the signal before its transmission via cable and then amplify it, while this is not necessary in the apparatus according to the present invention. Thus, the circuits schematically shown in FIG. 7 enable to achieve enhanced safety and a reduction of costs, while the increased response time does not adversely affect the envisaged applications.

Figure 4:
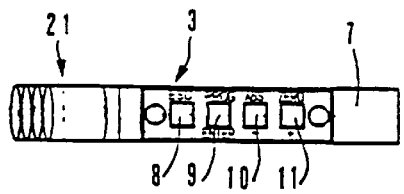
FIG. 4 is a plan view of the apparatus shown in FIGS. 1–3.

With reference to FIG. 4, showing keys 8–11 of the keyboard of the display unit 1, there is now provided a description of some functional features of the display unit, that are achieved by the associated circuits, comprising a microprocessor, and by software. Keys 8–11 are multifunction keys, depending on the condition (measuring, non calibration, non zero-setting, calibration, error) of the system.

Key 11 enables to zero-set the reading at a determined position of core 54 of transducer 51 of measuring head 2 connected to the display unit 1. When the system is under the condition whereby the zero-setting function is associated to key 11, the zero-setting operation is performed by pressing and then releasing key 11. The release of the key starts a delay time of a few seconds and at the end of this delay time the zero-setting is carried out. This feature is important in the event that measuring head 2 is integrated with the display unit 1. In fact, the pressure applied to key 11 could cause stresses to the measuring head, and consequently zero-setting errors.

In the programming condition, by suitably sequentially pressing keys 8 and 9, it is possible:

to define the arrangement of the digital indication and of the messages provided by the digital display device 15, for enabling the reading on display unit 1 in two horizontal positions at 180° from each other, and to de-activate the digital display device 15, for example when display unit 1 is arranged in a vertical position.

The hereindescribed invention can also be applied when the measurements are of a different type from the measurement of linear dimensions.

We claim:

1. A measuring apparatus comprising a display unit with a substantially right parallelepipedon shaped casing, considerably smaller in width with respect to length and depth, two display devices, substantially one of the analog and the other of the digital type, located at a front face of the casing having dimensions corresponding to said length and width, placed adjacent to each other and arranged along the length of the front face, a keyboard for programming and control purposes, and a measuring head, characterized in that the keyboard is arranged at a base of the casing and a coupling device for coupling the display unit to an external support is associated with the casing.

2. An apparatus according to claim 1, wherein said coupling device is arranged at a base of the casing opposite to the base with the keyboard.

3. An apparatus according to claim 2, wherein, said measuring head is coupled to the display unit at a position corresponding to the base of the casing opposite to the base with the keyboard, by means of an adjusting device for enabling the adjusting of the measuring head about an axis parallel to the section of the casing width.

4. An apparatus according to claim 3, wherein said adjusting device comprises a disk rigidly coupled to an end part of the measuring head, a seat having the shape of a portion of cylindrical surface, coupled to said casing and a friction element coupled to the casing and cooperating with the disk.

5. An apparatus according to one of claims 1 or 2, wherein said keyboard has less than ten keys.

6. An apparatus according to claim 5, wherein said keyboard has four keys.

7. An apparatus according to one of claims 1 or 2, including electric connectors arranged at a rear face of the casing.

8. An apparatus according to one of claims 1 or 2, wherein the analog display device is of a type with light emitting elements aligned along said length.

9. An apparatus according to claim 8, wherein said light emitting elements of the analog display device comprise diodes for selectively providing green, red and yellow light.

10. An apparatus according to one of claims 1 or 2, wherein the digital display device is adapted for displaying indications readable in a horizontal direction.

11. An apparatus according to claim 10, wherein said keyboard is adapted for controlling the digital display device causing it to display indications readable according to two horizontal arrangements of the display unit, rotated by 180 degrees with respect to each other.

12. An apparatus according to claim 10, wherein the keyboard can be used to de-activate the digital display device.

13. An apparatus according to one of claims 1 or 2, wherein the keyboard comprises a key for controlling the occurring of a zero setting operation with a prefixed delay from the release of the key.

14. An apparatus according to one of claims 1 or 2, wherein said length does not exceed 13 cm, said width 1.5 cm and said depth 8 cm.

15. An apparatus according to claim 14, wherein the values of said length, width and depth are approximately 11 cm, 1.2 cm and 7 cm, respectively.

16. An apparatus according to one of claims 1 or 2, comprising:
   an oscillator circuit, associated with a transducer of said measuring head, for providing an oscillating analog signal, with a variable period depending on the value of the dimension to be measured, and conversion circuits for converting said analog signal to a digital signal, by converting said variable period to a digital value by counting the cycles of a relatively high frequency periodic reference signal, and for providing said digital signal to a programming and drive circuit.

17. An apparatus according to claim 16, wherein said oscillator circuit has an operating frequency of about 30 kHz.

18. An apparatus according to claim 17, wherein the reference signal has a frequency of at least 1 MHz.

19. An apparatus according to one of claims 1 or 2, wherein said external support comprises a base and a stanchion supported by the base, wherein said stanchion can support said display or a plurality of said display units.

20. An apparatus according to claim 19, wherein said stanchion defines seats with a horizontal axis and said coupling device comprises an elongate element coupled to said base of the casing for engaging in one of said seats.

21. An apparatus according to claim 19, wherein said stanchion has a side with seats for a plurality of removable plates bearing indications relating to the measurements displayed by corresponding display units supported by the support.

22. An apparatus according to claim 19, wherein said display units are connected by means of cables to associated remote measuring heads and said stanchion has an opening for housing a section of the cables.

23. A measuring apparatus comprising a display unit with a substantially right parallelepipedon shaped casing, considerably smaller in width with respect to length and depth, two display devices, substantially one of the analog and the other of the digital type, located at a front face of the casing having dimensions corresponding to said length and width, placed adjacent to each other and arranged along the length of the front face, a keyboard for programming and control purposes, and a measuring head, wherein the keyboard is arranged at a base of the casing and a coupling device, for coupling the display unit to an external support, is associated with the casing, the digital display device being adapted for displaying indications readable in a horizontal direction, and the keyboard being adapted for controlling driving of the digital display device for selectively displaying on it indications readable according to two horizontal arrangements of the display unit, rotated by 180 degrees with respect to each other.

24. A measuring apparatus comprising a display unit with a substantially right parallelepipedon shaped casing, considerably smaller in width with respect to length and depth, two display devices, substantially one of the analog and the other of the digital type, located at a front face of the casing having dimensions corresponding to said length and width, placed adjacent to each other and arranged along the length of the front face, a keyboard for programming and control purposes, and a measuring head, wherein the keyboard is arranged at a base of the casing and a coupling device, for coupling the display unit to an external support, is associated with the casing, the measuring head being coupled to the display unit at a position corresponding to a base of the casing opposite to the base with the keyboard, by means of an adjusting device for enabling the adjusting of the measuring head about an axis parallel to the direction of the casing width.

* * * * *

UNITED STATES PATENT AND TRADEMARK OFFICE
CERTIFICATE OF CORRECTION

PATENT NO. : 6,014,905
DATED : January 18, 2000
INVENTOR(S) : Stefano Possati, et. al.

It is certified that error appears in the above-identified patent and that said Letters Patent is hereby corrected as shown below:

In column 5, line 15, "so" should read --50--.

In the claims:

In Claim 19, line 4 of the claim, --unit-- should be added between "display" and "or".

Signed and Sealed this

Fifth Day of December, 2000

*Attest:*

Q. TODD DICKINSON

*Attesting Officer*          *Director of Patents and Trademarks*